United States Patent
Stevenson et al.

(10) Patent No.: US 6,868,776 B2
(45) Date of Patent: Mar. 22, 2005

(54) METHOD AND APPARATUS FOR DEEP-FRYING A CHIP FOOD PRODUCT

(75) Inventors: Dale Stevenson, Yorba Linda, CA (US); Lesley Swartout, San Marcos, CA (US); Joanne Tarhan, Laguna Niguel, CA (US); Micah Tsern, Tustin, CA (US)

(73) Assignee: Taco Bell Corp., Irvine, CA (US)

( * ) Notice: Subject to any disclaimer, the term of this patent is extended or adjusted under 35 U.S.C. 154(b) by 311 days.

(21) Appl. No.: 10/015,039

(22) Filed: Dec. 10, 2001

(65) Prior Publication Data
US 2002/0043158 A1 Apr. 18, 2002

Related U.S. Application Data

(63) Continuation of application No. 09/479,584, filed on Jan. 7, 2000, now Pat. No. 6,386,094.

(51) Int. Cl.[7] .............................................. A47J 37/12
(52) U.S. Cl. .............................. 99/410; 99/403; 99/426; 99/394; 99/336
(58) Field of Search .......................... 99/403, 405, 410, 99/407, 413, 416, 418, 426, 427, 330, 336, 394, 409, 353; 211/181.1; 426/438, 439

(56) References Cited

U.S. PATENT DOCUMENTS

| | | | | |
|---|---|---|---|---|
| 859,717 A | * | 7/1907 | Zinn | 99/409 |
| 1,689,395 A | * | 10/1928 | Kourim | 426/105 |
| 2,186,345 A | * | 1/1940 | Reidenbach | 366/332 |
| 2,450,962 A | * | 10/1948 | Hornkohl et al. | 99/409 |
| 2,547,490 A | * | 4/1951 | Rich | 99/409 |
| 2,570,374 A | | 10/1951 | Pompa | |
| 2,710,617 A | * | 6/1955 | James et al. | 134/183 |
| 2,719,480 A | * | 10/1955 | Prickett et al. | 99/426 |
| 2,739,715 A | * | 3/1956 | Planeta | 211/414 |
| 2,740,349 A | | 4/1956 | Gonia | |
| 2,957,405 A | * | 10/1960 | Maldonado | 249/120 |
| 3,484,252 A | | 12/1969 | Popeil | |
| 3,511,172 A | * | 5/1970 | Jones | 249/120 |
| 3,605,605 A | * | 9/1971 | Sanchez | 99/386 |
| 4,232,596 A | | 11/1980 | Kroll et al. | |
| 4,321,859 A | | 3/1982 | Rimmeir | |
| 4,494,453 A | | 1/1985 | Bentson | |
| 4,542,684 A | | 9/1985 | Cantrell | |
| 4,854,227 A | | 8/1989 | Koopman | |
| 5,079,020 A | | 1/1992 | Koopman et al. | |
| 5,359,924 A | | 11/1994 | Roberts et al. | |
| D396,346 S | * | 7/1998 | Hoernig | D3/306 |
| 6,131,506 A | * | 10/2000 | Kemper | 99/425 |

FOREIGN PATENT DOCUMENTS

GB      2209684 A      5/1989

OTHER PUBLICATIONS

Brochure from Pronto Products Company.

* cited by examiner

*Primary Examiner*—Milton I. Cano
*Assistant Examiner*—Robert Madsen
(74) *Attorney, Agent, or Firm*—Knobbe, Martens, Olson & Bear, LLP (57) ABSTRACT

The apparatus is a chip fry lid having an array of long and short posts for contacting and agitating the chips during the deep frying process. In the preferred embodiment of the invention, each of the posts is formed by proximate sets of wire bent to form a series of long and short generally U-shaped prongs. A hinge at the front of the lid and a handle at the opposite end facilitate manual oscillation of the lid during the deep frying process to achieve a high percentage of chips of uniform high quality, both in terms of uniform cooking and chips having sufficient curls to form a chip functionally useful for holding dipped food and also aesthetically pleasing.

17 Claims, 7 Drawing Sheets

METHOD AND APPARATUS FOR DEEP-FRYING A CHIP FOOD PRODUCT

RELATED CASE

This application is a continuation of U.S. application Ser. No. 09/479,584, filed Jan. 7, 2000, now U.S. Pat. No. 6,386,094.

BACKGROUND OF THE INVENTION

1. Field of the Invention

The present invention relates generally to a method and apparatus for deep-frying a food product, and in particular, to an improved method and apparatus for deep-frying corn masa chips commonly known as tortilla chips or nacho chips.

2. Description of the Related Art

Various food products are deep-fried to make the product crispy. In addition, deep-frying adds flavor to the product. Tortilla chips are formed by cutting thin sheets of corn masa into generally triangular pieces and deep-frying these pieces to form crisp tortilla chips. Commonly, these pieces are manually moved during the deep-frying by a whisk. This procedure, however, does not consistently provide tortilla chips of uniform quality. Some chips may not be completely fried and many often fail to achieve the desired appearance. A substantial number of chips must be discarded in order to provide the restaurant patrons with properly cooked chips having the appropriate appearance. As a result, the current technique for making freshly prepared tortilla chips results in a substantial wastage of both corn masa and labor.

SUMMARY OF THE INVENTION

The preferred embodiment of the present invention relates to an apparatus and method for deep-frying tortilla chips on site in a restaurant so that the resulting freshly made chips have a consistently uniform high quality, both in terms of being uniformly cooked and having sufficient curls to form a chip functionally useful for holding dipped food and also aesthetically pleasing to the restaurant patrons.

The apparatus constructed in accordance with a preferred embodiment of the invention comprises a novel chip fry lid that is placed over the pieces of tortilla bread which are then deep-fried. As described below, the lid offers several significant advantages. The underside of the lid is advantageously formed from lengths of wire shaped to provide a series of downward projections or posts that are formed by two juxtaposed wires shaped to have a series of repeating prongs. The preferred embodiment includes prongs of two different lengths which are so located that each longer projection is proximate the shorter projection. As a result, the underside of the lid has a generally undulating appearance.

The chip fry lid of the preferred embodiment of the invention further advantageously includes: (i) a pair of hooks at one end which serve as a hinge to facilitate rotational movement of the lid about a fixed axis while the chips are agitated and contacted by the downward projections in the lid while deep-frying; (ii) a rear frame opposite the hooks to prevent chips from escaping during deep-frying; and (iii) a handle for rotating the handle through an arc about the hinge axis.

A significant feature of the preferred embodiment is that, unlike the current methods of chip-making, the method and apparatus provided by this invention provide for producing chips of consistent high quality, with little or no wastage. Further, the method employed for making the chips is quickly learned by any member of the restaurant staff. A correlative advantage is that the high quality chip product does not vary from worker to worker, so that freshly made tortilla chips of high quality can be prepared by any of the restaurant staff.

BRIEF DESCRIPTION OF THE DRAWINGS

The invention will now be described with reference to the appended drawings which depict embodiments of aspects and features of the invention. The illustrated embodiments, however, are intended to only illustrate and not to limit the invention. The drawings contain the following figures:

FIGS. 9A, 9B, 9C, 9D, 9E, 9F and 9G illustrate the several parts of the fry chip lid shown in FIGS. 3 and 4, to wit:

DETAILED DESCRIPTION OF THE PREFERRED EMBODIMENT

Tortilla chips for restaurant use commonly begin at the restaurant or at an offsite facility or supplier as corn flour and other ingredients that are rolled into a thin flat sheet from which the individual chips are die cut into a plurality of generally triangularly shaped pieces and then pre-baked. The resulting cornbread pieces are then stored under refrigeration until being deep fried in hot oil to create crispy tortilla chips.

The freshest and most desirable chips are deep fried on the restaurant premises. A number of the flat corn masa pieces are tossed in the hot oil and then manually agitated with a whisk. The ultimate fried shape of the chip is substantially determined within a few seconds after the corn masa strips are tossed into the hot oil. However, even a skilled worker generally is not able to consistently produce a large percentage of the desired chip. Rather, a number of chips are produced having the shape of the chip 10 shown in FIG. 1.

Figure 1:
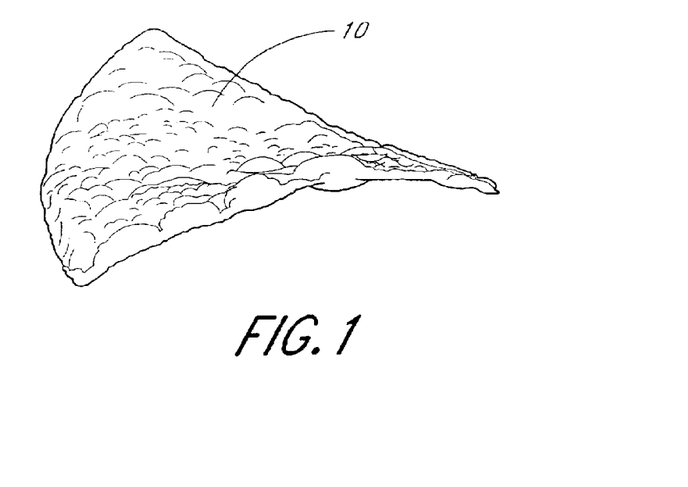
FIG. 1 illustrates a tortilla chip having a generally flat, uncurled shape.
Figure 2A:
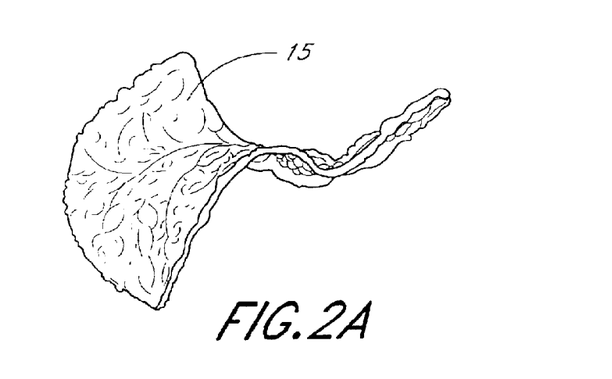
FIGS. 2A and 2B illustrate respective tortilla chips having the desired curled configuration.
Figure 2B:
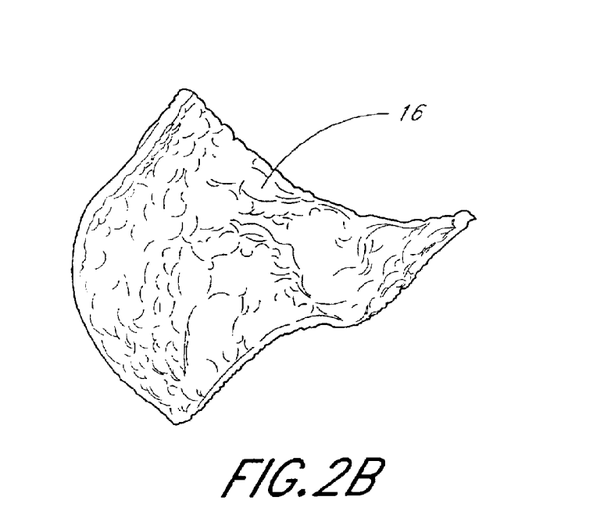

Although such chips 10 may be fully cooked and quite edible, the chip 10 is very nearly flat and does not have the aesthetic appeal of the curled chips 15, 16 shown in FIGS. 2A and 2B nor is chip 10 as functionally useful for holding dipped foods.

Moreover, the conventional chip frying technique often produces fried chips of varying quality, not only in aesthetic appearance but in not being thoroughly fried because the cooking oil did not uniformly contact all of the individual chips. Thus, in order to supply to the restaurant patron a chip product that is uniform in quality, the conventional technique results in a number of chips being thrown away causing an obvious wastage of food.

Figure 3:
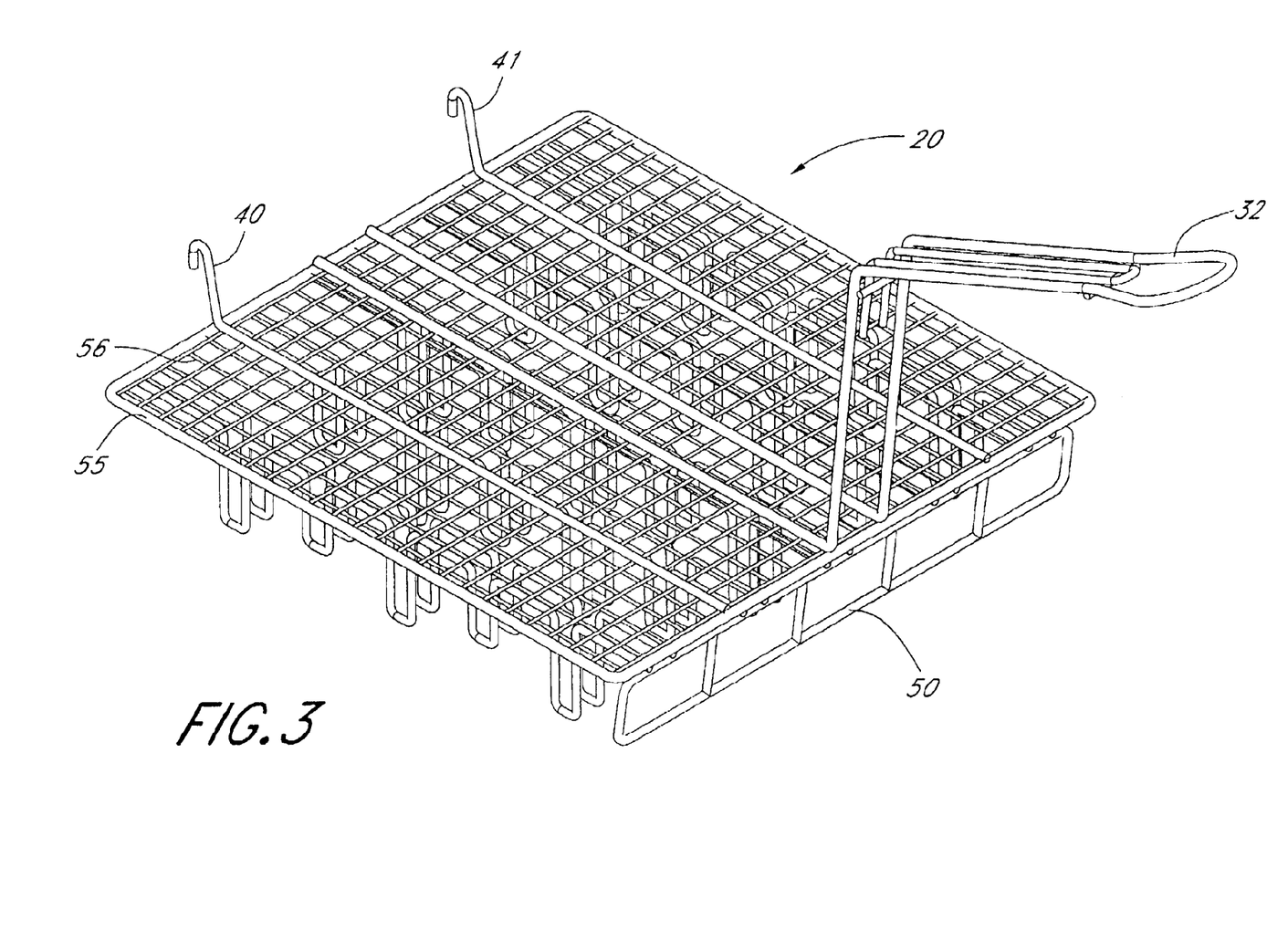
FIG. 3 is a perspective view looking down on the top of the chip fry lid as constructed in accordance with the preferred embodiment of the invention.
Figure 4:
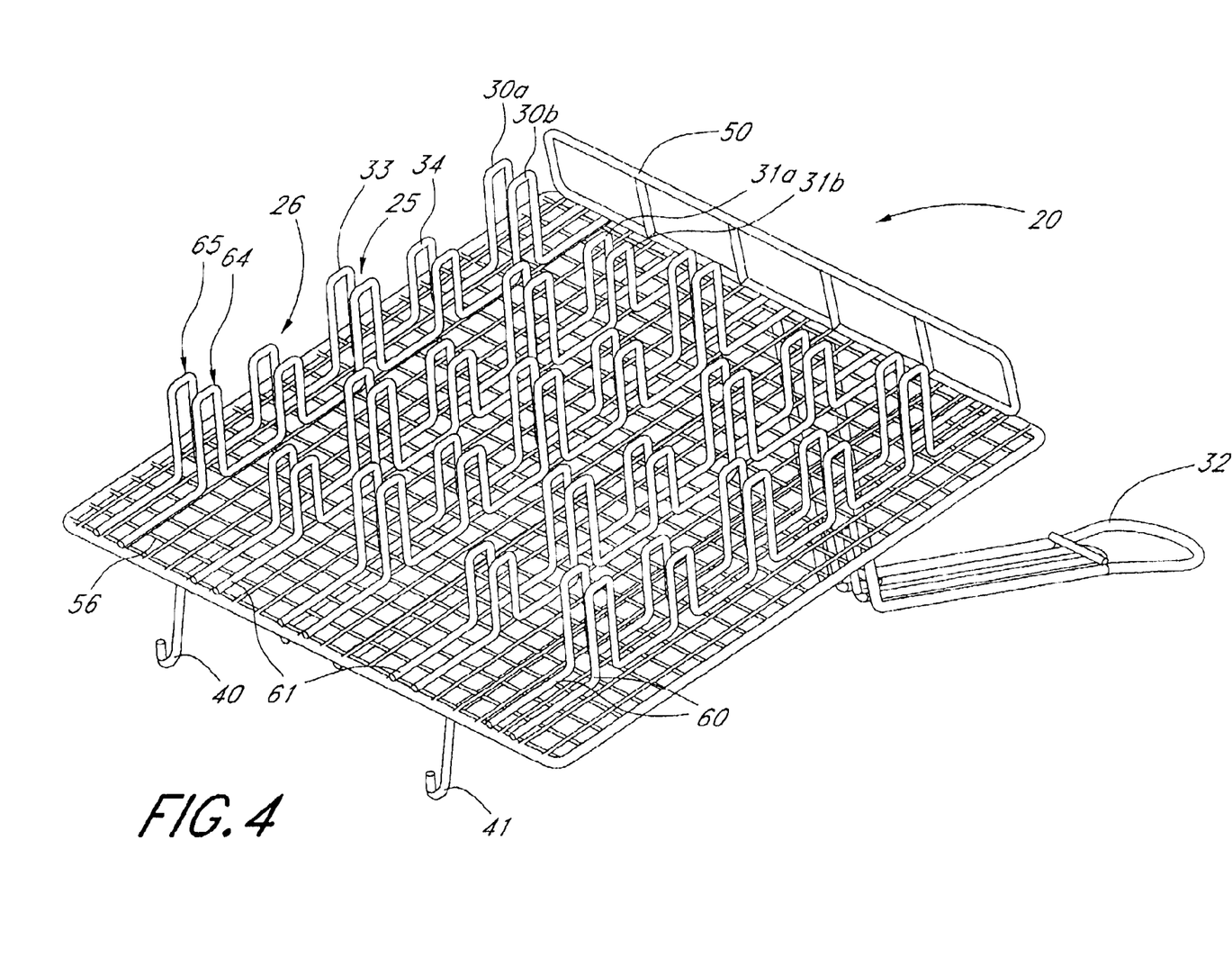
FIG. 4 is a perspective view looking down on the bottom of the chip fry lid shown in FIG. 3.

The significant problems associated with the conventional chip preparation are met by the chip fry lid 20 shown in the Figures beginning with FIG. 3. As best shown in FIG. 4, the lid 20 includes an array of spaced apart long posts 25 and short posts 26. The bottom surface of the lid 20 thus has a generally undulate pattern of posts that create a kind of "bed of nails." However, rather than having a sharp pointed end, each of the posts 25, 26 have a generally blunt end formed by two adjacent U-shaped prongs. As shown, lengths of wire 30a, 30b are bent into a series of long and short U-shaped prongs 33, 34. This "U" is, of course, inverted in the FIG. 4. In the preferred embodiment, each of the wire pairs 30a, 30b are located relatively closely spaced to each other with a longer space separating wire pairs 30a, 30b from wire pairs 31a, 31b.

A handle 32 extends upwardly and outwardly from the rear and top of the chip fry lid 20. As described below, this handle 32 serves both to lift the lid in and out of the conventional fry basket 35 shown in FIG. 5, but also to enable contact agitation of the frying chips. A suitable basket 35 is the Model AW14A sold by Archer Wire, Bedford Park, Ill.

Figure 5:
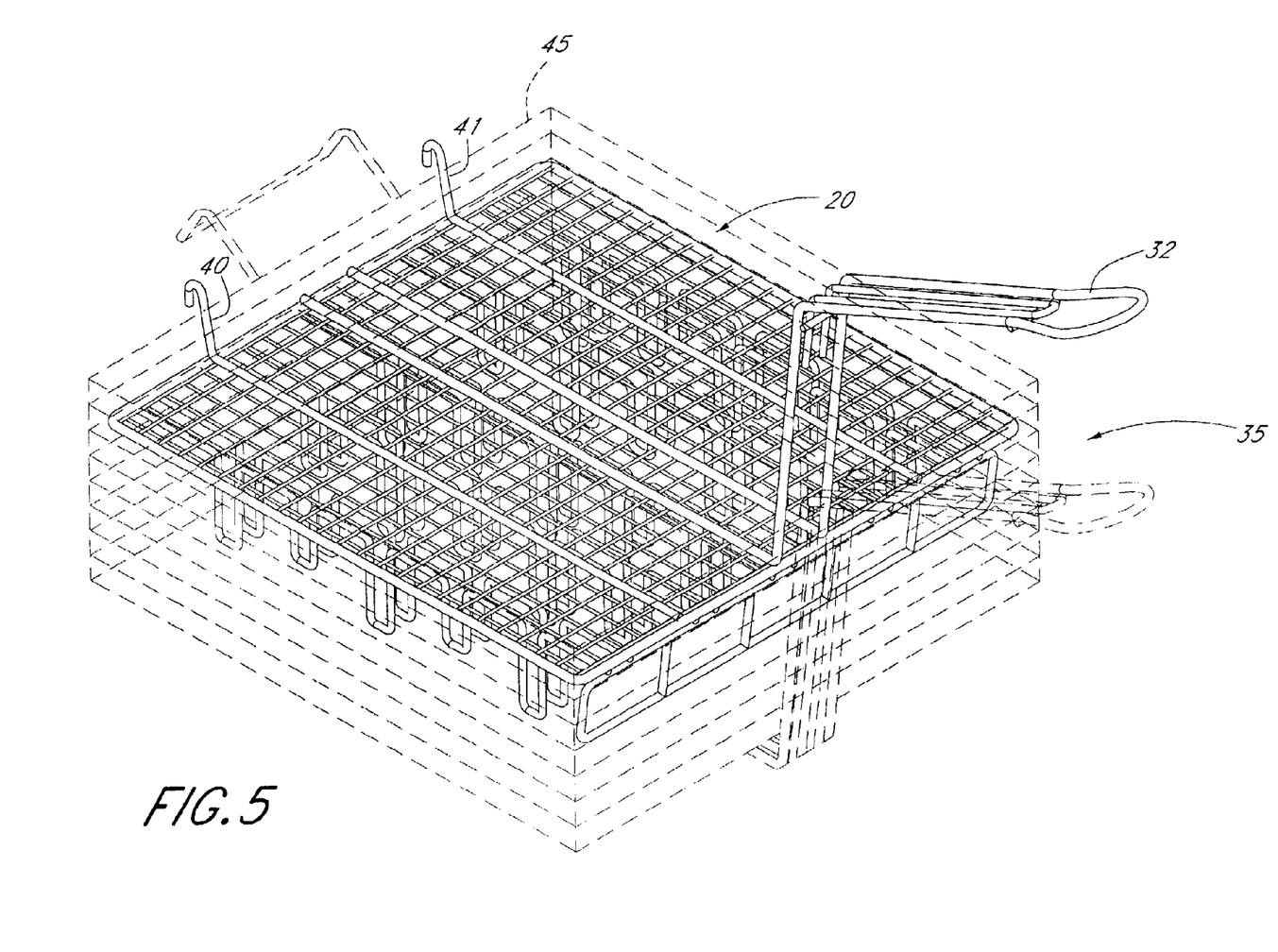
FIG. 5 is a perspective view of the chip fry lid shown in FIGS. 3 and 4 with the lid inserted into the fry basket, the basket being a conventional deep fry basket and shown for simplicity by a series of rectangles.
Figure 6:
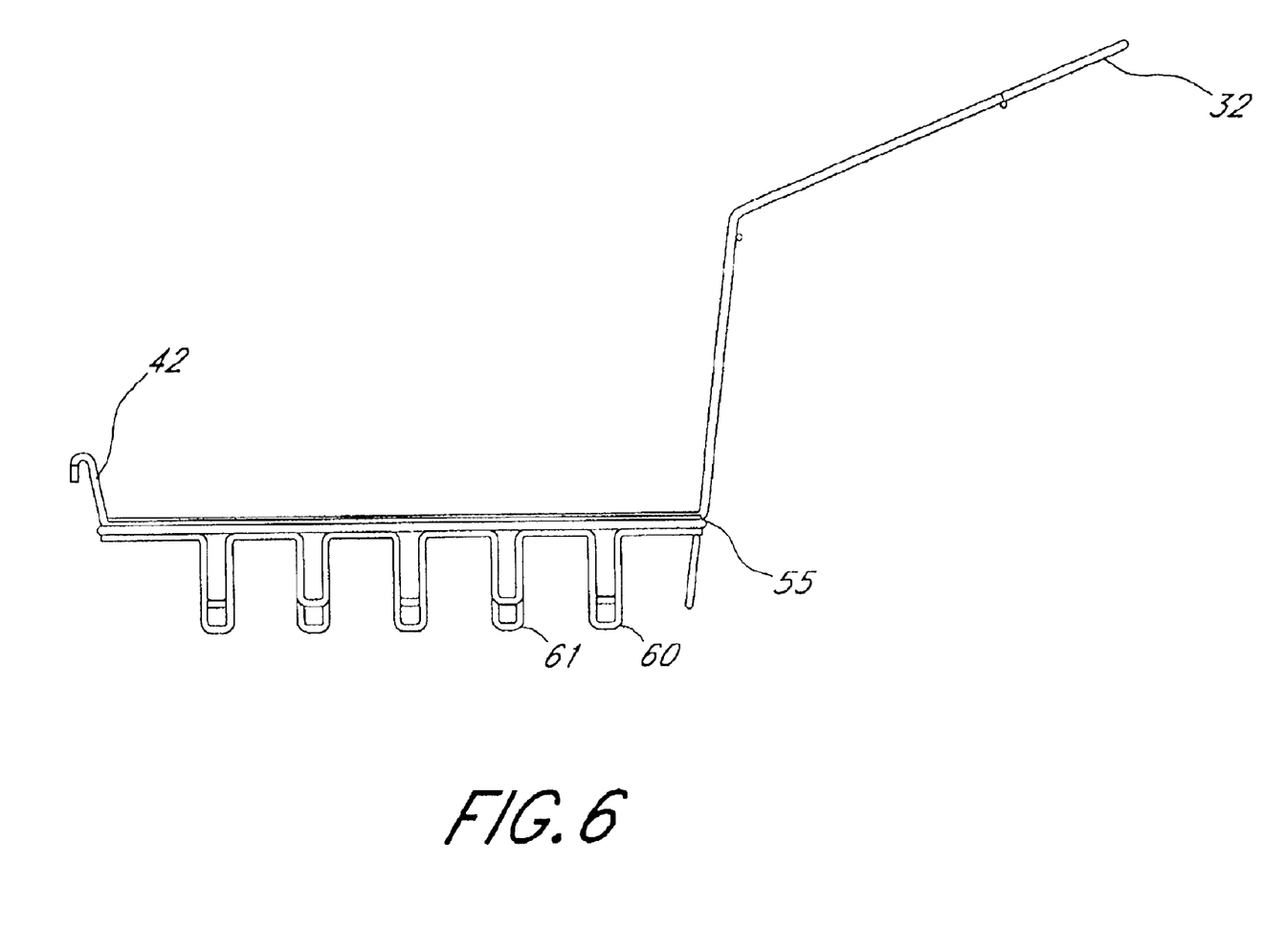
FIG. 6 is a front elevational view of the chip fry lid.
Figure 7:
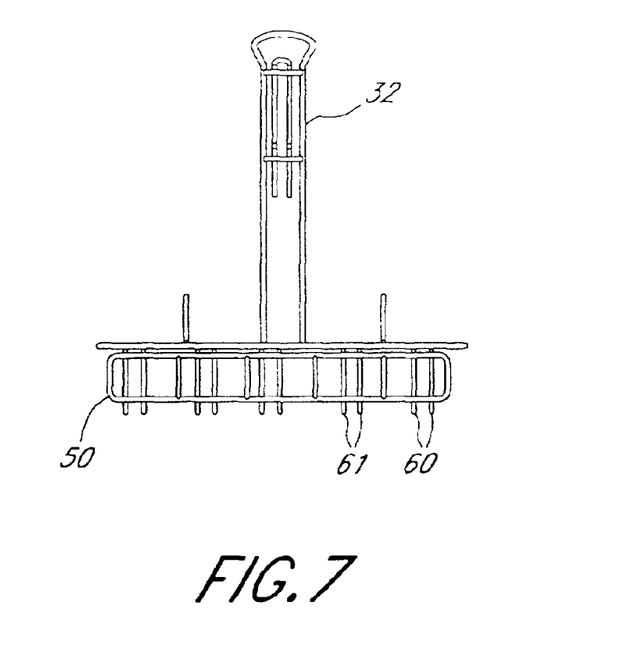
FIG. 7 is a side elevational view of the chip fry lid.
Figure 8:
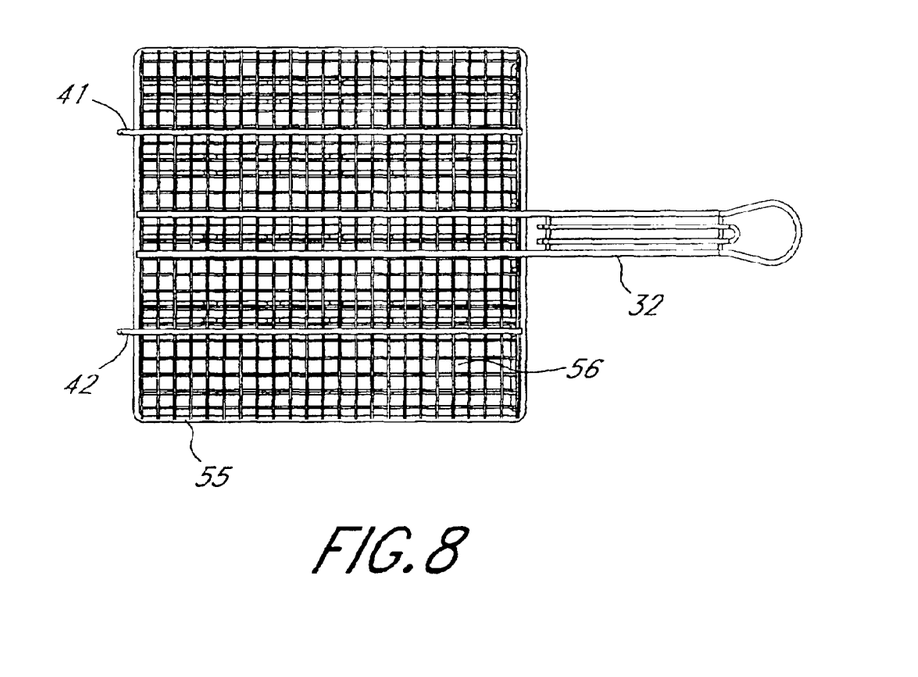
FIG. 8 is a top elevational view of the chip fry lid.

In use, the chip fry lid 20 is placed within the conventional basket 35 as shown in FIG. 5. Hooks 40, 41 located at the front of the chip fry lid 20 hang over the back top edge 45 of the basket. These hooks both serve to suspend the chip fry lid 20 within the basket but also facilitate manual oscillation of the lid 20 about a fixed axis defined by edge 45.

In use, a plurality of the unfried corn masa chips are loaded into basket 35 while the lid 20 is raised or removed. The chip fry lid 20 is then placed on top of the chips with the hooks engaged as shown in FIG. 5. The loaded basket is then immersed in hot oil, and the operator immediately begins to continuously move the handle 32 up and down through an arc of approximately 30° to contact and agitate the chips being fried.

The frying chips tend to float at the top of the cooking oil, using chip fry lid 20, however, during the frying of the chips, the prongs or posts 25, 26 engage the surface of the cooking chips to submerge them below the surface of the oil. At the end of the frying cycle (typically less then a minute and normally timed at about 43 seconds), the basket 35 and attached chip fry lid 20 are both removed from the hot oil, the lid is pivoted open or removed, and the basket 35 inverted to allow the deep fried chips to fall out.

The contact and agitation produced by lid 20 achieves a considerably larger percentage of chips having the desired curled configuration of which samples are shown at 15, 16 in FIGS. 2A and 2B. Not only is the desired curling achieved but the agitation produces circulation of the cooking oil over and under each chip to promote even cooking of the chips so that few if any need to be discarded.

Of special significance is that the quality of the resulting tortilla chips do not vary from worker to worker since the lid, unlike a whisk, ensures that all of the chips are contacted and agitated.

Another feature of the preferred embodiment of the invention is that the chip fry lid 20 is designed to closely fit the opening to the interior of basket 35 so that the chips are repeatedly submerged in the cooking oil entrapped beneath the wire mesh 56 of the lid during the frying process. In order to prevent chips from escaping out the rear of the lid 20 during the agitating procedure, a downward extending rear frame 50 is attached to the rear of lid 20. This frame is advantageously located so as to be proximate to but not quite touching the interior rear end of the basket 35 as the lid handle 32 is raised up and down during the agitation cycle. The chips are thus constrained by the rear frame 50 and prevented from leaving the basket during agitation.

Figures 9A, 9B, 9C, 9D, 9E, 9F, 9G:
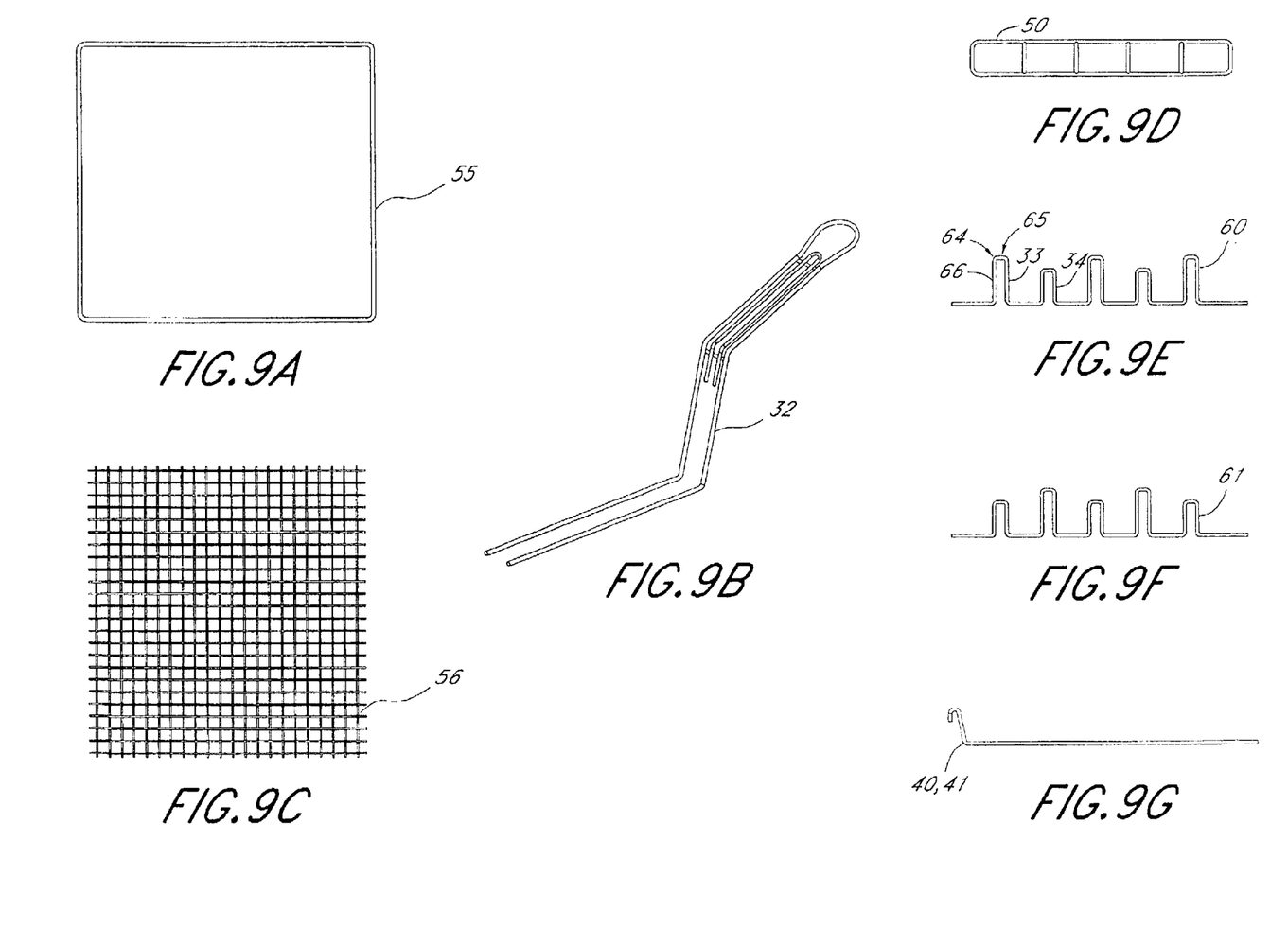
FIG. 9A shows the frame.
FIG. 9B shows the handle.
FIG. 9C shows the wire mesh.
FIG. 9D shows the rear frame.
FIG. 9E shows the wire bent to form a series of prongs in the LSLSL configuration where L is the longer prong and S is the shorter prong.
FIG. 9F shows the wire bent to form a series of prongs in the SLSLS configuration.
FIG. 9G shows the wire that is bent to provide the hook-hinge for the chip fry lid.

Another advantage of the preferred embodiment of the invention is that it can be inexpensively and quickly manufactured from inexpensive parts. Referring to FIG. 9, the frame 55 is a length of wire bent into a rectangle. On the underside, frame 55 is welded to a rectangle piece of wire mesh 56 (FIG. 9C). Over this mesh 56 are welded six of the bent wire LSLSL prong units 60 shown in FIG. 9E interposed with four of the bent wire SLSLS units 61 (FIG. 9F).

Wire members 60, 61 are bent as shown to form the U-shaped prongs 33, 34 that provide a curvature 64 between the generally flat bottom 65 and sides 66 (see FIGS. 4 and 9E). Flat surface 65 insures that the frying chips are kept submerged while the curvature 64 facilitates the formation of the desired curling of the fried chip 15, 16 of FIGS. 2A and 2B.

As described above, the preferred embodiment of the invention utilizes pairs of closely adjacent prong units 60 or 61 to provide the posts or projections 25, 26 of different lengths throughout the bottom surface of the chip fry lid 20. These posts of different lengths push the frying chips to different elevations in the cooking oil, thereby inhibiting chips from sticking to one another and insuring that the cooking oil freely circulates to all of the chips so that that all of the chips are evenly fried during the short frying sequence. As a result, wastage of chips due to uneven cooking is substantially eliminated, even when the invention is used by inexperienced members of the restaurant staff.

The rear frame 50 is welded at the rear of the lid bottom as best shown in FIG. 4. The handle 32 (FIG. 9B) and hook wires 40, 41 (FIG. 9G) are welded to the top of the frame 55 as best shown in FIG. 3.

The entire frame after assembly is then chrome plated to achieve both a pleasing appearance and an apparatus that is long lasting and easily cleaned. The open configuration of the lid is also sufficiently light in weight so as to be readily agitated while being strong enough to stand up to hard use in a commercial restaurant facility.

What is claimed is:

1. An apparatus for deep-frying in a basket a chip food product that is consistent in quality, both in terms of being properly cooked but also having a curled configuration adapted for holding dipped food and having an aesthetically pleasing appearance, the apparatus comprising:
    a basket for holding a chip food product:
    a chip fly lid engageable with said basket having a wire frame and an array of alternating long and short U-shaped wire prongs depending from the bottom of said lids, wherein the long U-shaped wire prongs extend lower than the short U-shaped wire prongs.

2. The apparatus of claim 1, further comprising a handle connected to said lid extending upwardly and outwardly from said lid.

3. The apparatus of claim 1, further comprising at least one hook extending from the lid adapted to engage a top edge of the basket.

4. An apparatus for deep-frying in a basket a chip food product that is consistent in quality, both in terms of being properly cooked but also having a curled configuration adapted for holding dipped food and having an aesthetically pleasing appearance, the apparatus comprising:

a basket for holding a chip food product;

a chip fry lid engageable with said basket having a wire frame and wires bent to form a series of repeating long and short posts attached to said frame and extending downwardly from said frame, said long posts extending further downwardly from said frame than said short posts.

5. The apparatus of claim 4, wherein the long and short posts are alternating.

6. The apparatus of claim 4, wherein the long and short posts are generally U-shaped.

7. The apparatus of claim 4, wherein each of the long and short posts comprises a pair of adjacent bent wire portions.

8. The apparatus of claim 4, further comprising a handle connected to said lid extending upwardly and outwardly from said lid.

9. The apparatus of claim 4, further comprising at least one hook extending from the lid adapted to engage a top edge of the basket.

10. An apparatus for deep-frying in a basket a chip food product that is consistent in quality, both in terms of being properly cooked but also having a curled configuration adapted for holding dipped food and having an aesthetically pleasing appearance, the apparatus comprising:

a basket for holding a chip food product;

a chip fly lid engageable with said basket having a wire frame and a series of repeating long and short posts attached to said frame and extending downwardly from said frame, each of said posts formed by juxtaposed pairs of U-shaped wire prongs depending from said frame.

11. The apparatus of claim 10, further comprising a handle connected to said lid extending upwardly and outwardly from said lid.

12. The apparatus of claim 10, further comprising at least one hook extending from the lid adapted to engage a top edge of the basket.

13. The apparatus of claim 10, wherein the long posts extend further downwardly from the wire frame than the short posts.

14. An apparatus for deep-frying in a basket a chip food product that is consistent in quality, both in terms of being properly cooked but also having a curled configuration adapted for holding dipped food and having an aesthetically pleasing appearance, the apparatus comprising:

a basket for holding a chip food product;

a chip fly lid engageable with said basket having a wire frame and a series of repeating long and short posts attached to said frame and extending downwardly from said frame, each of said posts formed by juxtaposed pairs of bent wires in which the bottom of each post is formed by wires bent to form two generally horizontal wires, each horizontal wire connected by curved wires to two generally vertical wires.

15. The apparatus of claim 14, further comprising a handle connected to said lid extending upwardly and outwardly from said lid.

16. The apparatus of claim 14, further comprising at least one hook extending from the lid adapted to engage a top edge of the basket.

17. The apparatus of claim 14, wherein the long posts extend further downwardly from the wire frame than the short posts.

* * * * *

UNITED STATES PATENT AND TRADEMARK OFFICE
CERTIFICATE OF CORRECTION

PATENT NO. : 6,868,776 B2  Page 1 of 1
APPLICATION NO. : 10/015039
DATED : March 22, 2005
INVENTOR(S) : Dale Stevenson et al.

It is certified that error appears in the above-identified patent and that said Letters Patent is hereby corrected as shown below:

At column 4, line 56, in Claim 1, please delete "product:" and insert therefore, -- product; --.

At column 4, line 57, in Claim 1, please delete "fly" and insert therefore, -- fry --.

At column 4, line 60, in Claim 1, please delete "lids" and insert therefore, -- lid, --.

At column 5, line 30, in Claim 10, please delete "fly" and insert therefore, -- fry --.

At column 6, line 17, in Claim 14, please delete "fly" and insert therefore, -- fry --.

Signed and Sealed this

Twenty-eighth Day of November, 2006

JON W. DUDAS
*Director of the United States Patent and Trademark Office*